No. 841,836. PATENTED JAN. 22, 1907.
W. WHITE.
SIDE BEARING FOR RAILWAY CARS.
APPLICATION FILED APR. 2, 1906.
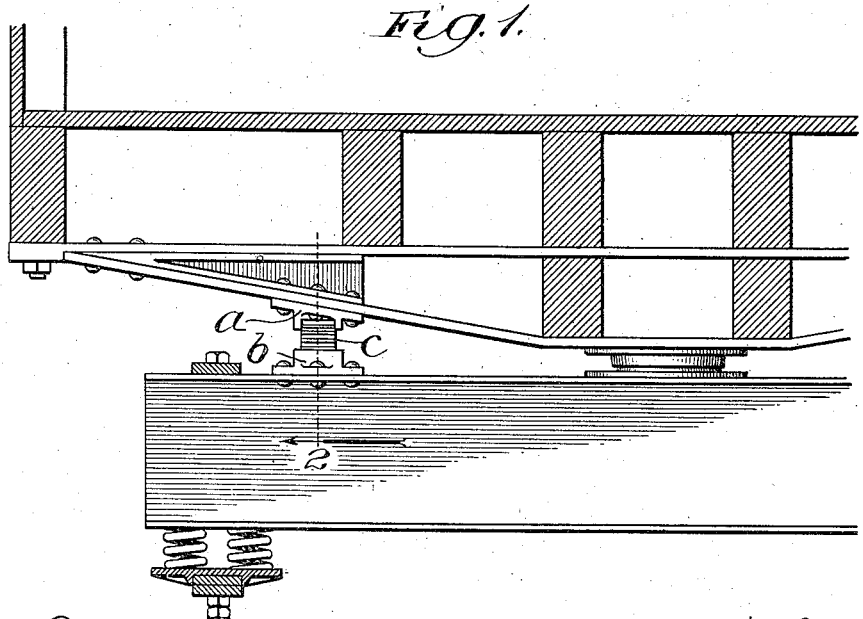
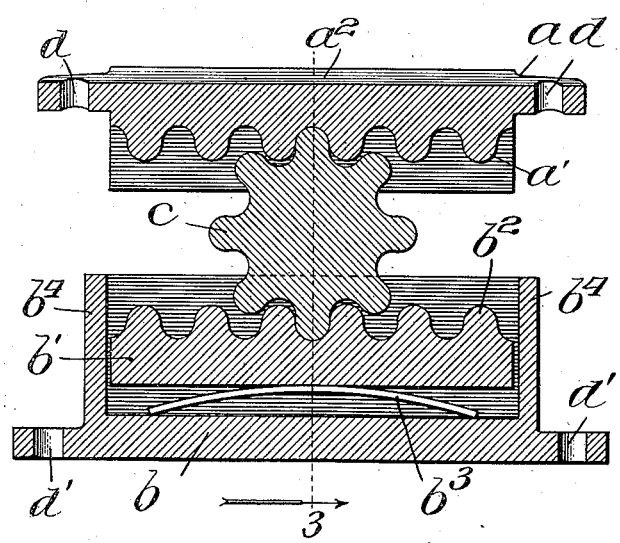
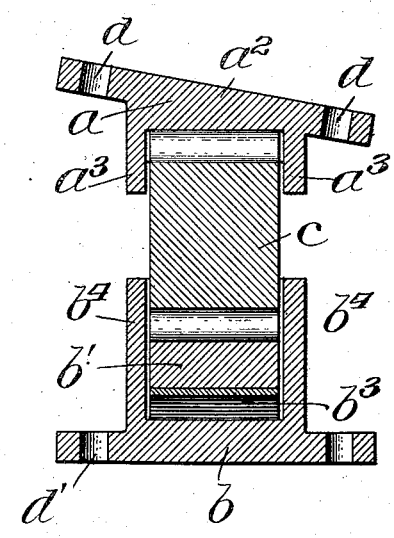
Witnesses:
Inventor:
William White.
By Thomas F. Sheridan,
Atty.

UNITED STATES PATENT OFFICE.

WILLIAM WHITE, OF CHICAGO, ILLINOIS.

SIDE BEARING FOR RAILWAY-CARS.

No. 841,836.  Specification of Letters Patent.  Patented Jan. 22, 1907.

Application filed April 2, 1906. Serial No. 309,404.

*To all whom it may concern:*

Be it known that I, WILLIAM WHITE, a citizen of the United States, residing at Chicago, in the county of Cook and State of Illinois, have invented certain new and useful Improvements in Side Bearings for Railway-Cars, of which the following is a specification.

My invention relates to side bearings, and has for its object to provide an efficient side bearing in which provision is made for the yielding movement of parts of the bearing and for positively guiding the parts of the bearing in their movement.

In the accompanying drawings, Figure 1 is an end elevation of a portion of a car-frame, partly in section, showing the truck and body-bolsters with my improved side bearing thereon. Fig. 2 is a longitudinal section on the line 2 of Fig. 1. Fig. 3 is a transverse section on the line 3 of Fig. 2.

My improved side bearing comprises the upper or body member $a$, having an inclined upper face $a^2$, adapted for connection to the inclined portion of the body portion by any suitable connecting means passed through the openings $d$. This upper member has also flanges $a^3$, forming a box-like portion on its under side, and is provided with a series of teeth $a'$ on its bearing-face. The lower or truck member of the side bearing $b$ is provided with flanges $b^4$, forming a box-like portion. Within this box-like portion is mounted a bearing member $b'$, having on its bearing-face a series of teeth $b^2$, corresponding to the teeth $a'$ of the upper member. Between the upper and lower members is a toothed roller $c$, the teeth of which engage the teeth of the upper and lower bearing members. This roller is held in position and guided in its movements by the flanges on the upper and lower members. The lower bearing portion $b'$ of the truck member is yieldingly supported by the spring $b^3$, which normally holds the bearing portion up in engagement with the roller. This spring permits a slight yielding of the bearing portion corresponding to the movements of the car-body.

It will be seen that while the weight is not normally carried by the side bearings I still have provided a side bearing in which the parts are normally in contact, in which they are positively guided in their movements, and in which there is a yielding to compensate for the movements of the car-body from one side to the other.

I claim—

1. A side bearing comprising upper and lower bearing members, a circular roller interposed between them, and positive means for compelling the roller to travel upon its bearings to correspond with the relative movement of the car truck and body.

2. A side bearing comprising an upper member having a toothed bearing-face, a lower member having a correspondingly-toothed bearing-face, and a toothed roller interposed between the upper and lower members and engaging both the toothed bearing-faces.

3. A side bearing comprising an upper member having a toothed bearing-face, a lower member having a correspondingly-toothed bearing-face, a toothed roller interposed between the upper and lower members and engaging both the toothed bearing-faces, and means for yieldingly supporting the lower member.

4. A side bearing having an upper or body member comprising a bearing-face and flanges surrounding the bearing-face, a lower or truck member comprising a box-like portion, a bearing portion therein, means for yieldingly supporting the bearing portion, and a roller interposed between the upper and lower members.

5. A side bearing having an upper or body member comprising a toothed bearing-face and flanges surrounding the bearing-face, a lower or truck member comprising a box-like portion, a toothed bearing portion therein, means for yieldingly supporting the bearing portion, and a roller interposed between the upper and lower members.

WILLIAM WHITE.

Witnesses:
ANNIE C. COURTENAY,
WILLIAM T. JONES.